(12) United States Patent
Tomar et al.

(10) Patent No.: US 7,738,489 B2
(45) Date of Patent: Jun. 15, 2010

(54) METHODS, SYSTEMS, AND COMPUTER PROGRAM PRODUCTS FOR USING SIGNALING SYSTEM 7 (SS7) SUBSYSTEM NUMBERS TO ROUTE MESSAGES TO SESSION INITIATION PROTOCOL (SIP) NODES

(75) Inventors: Mahesh Tomar, Morrisville, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 482 days.

(21) Appl. No.: 11/476,430

(22) Filed: Jun. 28, 2006

(65) Prior Publication Data

US 2007/0019633 A1      Jan. 25, 2007

Related U.S. Application Data

(60) Provisional application No. 60/695,208, filed on Jun. 29, 2005.

(51) Int. Cl.
*H04J 3/22* (2006.01)
(52) U.S. Cl. .................. 370/467; 370/353; 370/389; 370/401
(58) Field of Classification Search ................. None
See application file for complete search history.

(56) References Cited

U.S. PATENT DOCUMENTS

| | | | |
|---|---|---|---|
| 5,008,929 A | 4/1991 | Olsen et al. | |
| 5,712,908 A | 1/1998 | Brinkman et al. | |
| 5,812,639 A | 9/1998 | Bartholomew et al. | |
| 5,852,660 A | 12/1998 | Lindquist et al. | |
| 5,862,129 A | 1/1999 | Bell et al. | |
| 5,930,700 A | 7/1999 | Pepper et al. | |
| 5,983,217 A | 11/1999 | Khosravi-Sichani et al. | |
| 6,070,076 A | 5/2000 | Valentine | |
| 6,175,574 B1 | 1/2001 | Lewis | |
| 6,205,214 B1 | 3/2001 | Culli et al. | |

(Continued)

FOREIGN PATENT DOCUMENTS

WO       WO 01/24499 A1     4/2001

(Continued)

OTHER PUBLICATIONS

Notification of Transmittal of the International Search Report and the Written Opinion of the International Searching Authority, or the Declaration for International Application No. PCT/US06/25284 (Feb. 16, 2007).

(Continued)

*Primary Examiner*—Daniel J Ryman
*Assistant Examiner*—Tito Pham
(74) *Attorney, Agent, or Firm*—Jenkins, Wilson, Taylor & Hunt, P.A.

(57) ABSTRACT

Methods, systems, and computer program products for using signaling system 7 (SS7) subsystem numbers to route message to session initiation protocol (SIP) nodes. According to one method, an SS7 message can be received. A SIP message can be generated based on the SS7 message. A subsystem number associated with the SS7 message can be identified. A destination SIP node for the SIP message can be identified based on the subsystem number. Further, the SIP message can be forwarded to the SIP node.

33 Claims, 5 Drawing Sheets

U.S. PATENT DOCUMENTS

| | | | |
|---|---|---|---|
| 6,324,183 B1 | 11/2001 | Miller et al. | |
| 6,324,279 B1 | 11/2001 | Kalmanek, Jr. et al. | |
| 6,327,270 B1 | 12/2001 | Christie et al. | |
| 6,330,324 B1 | 12/2001 | Sabinson et al. | |
| 6,363,431 B1 | 3/2002 | Hammer et al. | |
| 6,535,506 B1 | 3/2003 | Narain et al. | |
| 6,560,326 B1* | 5/2003 | Clark | 379/221.09 |
| 6,606,379 B2 | 8/2003 | Khadri et al. | |
| 6,611,532 B1 | 8/2003 | Madour et al. | |
| 6,683,881 B1* | 1/2004 | Mijares et al. | 370/401 |
| 6,760,343 B1* | 7/2004 | Krishnamurthy et al. | 370/466 |
| 6,785,374 B2 | 8/2004 | Wang et al. | |
| 6,785,378 B2* | 8/2004 | Mar | 379/229 |
| 6,882,638 B1* | 4/2005 | Garcia-Martin et al. | 370/352 |
| 6,914,973 B2 | 7/2005 | Marsico | |
| 2002/0196779 A1 | 12/2002 | Khadri et al. | |
| 2004/0005045 A1 | 1/2004 | Adams et al. | |
| 2007/0008955 A1 | 1/2007 | Delaney et al. | |
| 2008/0175223 A1* | 7/2008 | Croak et al. | 370/352 |

FOREIGN PATENT DOCUMENTS

| | | |
|---|---|---|
| WO | WO 02/45439 A2 | 6/2002 |
| WO | WO 02/49315 A2 | 6/2002 |
| WO | WO 2007/008685 A2 | 1/2007 |

OTHER PUBLICATIONS

Notification of Transmittal of the International Search Report and the Written Opinion of the International Searching Authority, or the Declaration for corresponding International Application No. PCT/US2006/026555 (Feb. 16, 2007).

Gurbani et al., "The Spirits (Services in PSTN Requesting Internet Services) Protocol," Network Working Group, pp. 1-50 (Oct. 2004).

Sidebottom et al., "SS7 MTP3-User Adaptation Layer (M3UA)," Network Working Gropu, pp. 1-107 (Feb. 2002).

Anonymous, "SS7 Telephony Technical Specifications," Trillium Digital systems, Inc., www.trillium.com/products/ss7-telephony/techical, p. 1 (2001).

Anonymous, "Message Transfer Part (MTP) Level 3," Trillium Digital Systems, Inc., www.trillium.com/tech/1078028.html, pp. 1-3 (2001).

Official Action for U.S. Appl. No. 11/193,240 (Aug. 4, 2009).

* cited by examiner

METHODS, SYSTEMS, AND COMPUTER PROGRAM PRODUCTS FOR USING SIGNALING SYSTEM 7 (SS7) SUBSYSTEM NUMBERS TO ROUTE MESSAGES TO SESSION INITIATION PROTOCOL (SIP) NODES

CROSS-REFERENCE TO RELATED APPLICATION

This application claims the benefit of U.S. Provisional Patent Application No. 60/695,208, filed Jun. 29, 2005, the disclosure of which is incorporated by reference herein in its entirety.

TECHNICAL FIELD

The subject matter described herein relates to routing messages to SIP nodes. More particularly, the subject matter described herein relates to methods, systems, and computer program products for using SS7 subsystem numbers to route messages to SIP nodes.

BACKGROUND

Signaling gateways are network components operable to translate signaling messages between different network types. For example, a signaling gateway may be used to translate portions of signaling messages transmitted between an Internet protocol (IP) network domain and the public switched telephone network (PSTN) domain. In one example, an SS7/session initiation protocol (SIP) gateway (SSG) may translate between SS7 transaction capabilities application part (TCAP) messages and SIP messages.

SIP provides a signaling and call setup protocol for IP-based communications, such as communications in an IP multimedia subsystem (IMS) network environment, that can support call processing functions and features present in PSTN. There is a desire in the telecommunications market to extend the services provided by SIP to the PSTN domain. This involves providing SSGs for enabling SIP nodes in the IP domain to communicate with network elements in the SS7 domain. An SSG enables the transfer of AIN-based service messages to SIP nodes for invoking SIP-based services.

One difficulty with using SSGs for communicating messages from the SS7 domain to SIP nodes in the IP domain is the identification of SIP nodes. In one technique for identifying SIP nodes, the SSG has a one-to-one mapping with a SIP node. For example, when an AIN/IN trigger is detected at a service switching point (SSP), the SSP communicates an SS7 query message to an SSG, which generates a SIP query message corresponding to the SS7 query message and communicates the SIP query message to a mapped SIP node. This technique ties a SIP element to a particular SSG and results in low flexibility and scalability.

In another technique for identifying SIP nodes, an SSG may have provisioned directory number ranges supported by each SIP node. For example, first and second SIP nodes may support directory numbers 212-213-0000 to 212-213-5555 and 212-213-5556 to 212-213-9999, respectively. An SSG may include a database of the directory numbers and corresponding SIP nodes for determining an appropriate SIP node to communicate received SS7 messages. This technique may be disadvantageous because it requires that the SSG maintain a database for the directory numbers. For example, any time directory number provisioning changes occur in either the SS7 domain or the IP domain, changes may be required at the SSG. If a SIP node supports directory number 212-213-0000, and the number is moved to another SIP node, the change must be propagated to the SSG maintaining the directory number.

Accordingly, in light of these difficulties described above, there exists a need for improved methods, systems, and computer program products for routing messages to SIP nodes.

SUMMARY

According to one aspect, the subject matter described herein comprises methods, systems, and computer program products for using signaling system 7 (SS7) subsystem numbers (SSNs) to route messages to session initiation protocol (SIP) nodes. One method includes receiving an SS7 message. A SIP message can be generated based on the SS7 message. A subsystem number associated with the SS7 message can be identified. A destination SIP node for the SIP message can be identified based on the subsystem number. Further, the SIP message can be forwarded to the SIP node.

According to another aspect, the subject matter described herein comprises methods, systems, and computer program products for distributing an SS7 message to one of a plurality of SSGs. One method includes receiving an SS7 message. A global title translation of the SS7 message can be performed to identify a subsystem number for the SS7 message. An SSG from a plurality of SSGs may be selected based on the subsystem number. The SS7 message is forwarded to the selected SSG.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Methods, systems, and computer program products for using SS7 subsystem numbers to route messages to SIP nodes according to embodiments of the subject matter described herein may be implemented in any suitable network device or devices implementing SS7 service. For example, the methods, systems, and computer program products may be implemented in a router, switch, gateway, SS7 server, signal transfer point (STP), or other suitable network device. In one exemplary implementation, the subject matter described herein may be implemented as one or more computer program products comprising computer-executable instruction embodied in a computer readable medium accessible by a network device. As stated above, exemplary computer-readable media suitable for implementing the subject matter described herein include chip memory devices, optical disks, magnetic disks, application-specific integrated circuits, programmable logic devices, or any other medium capable of storing computer-executable instructions.

Figure 1:
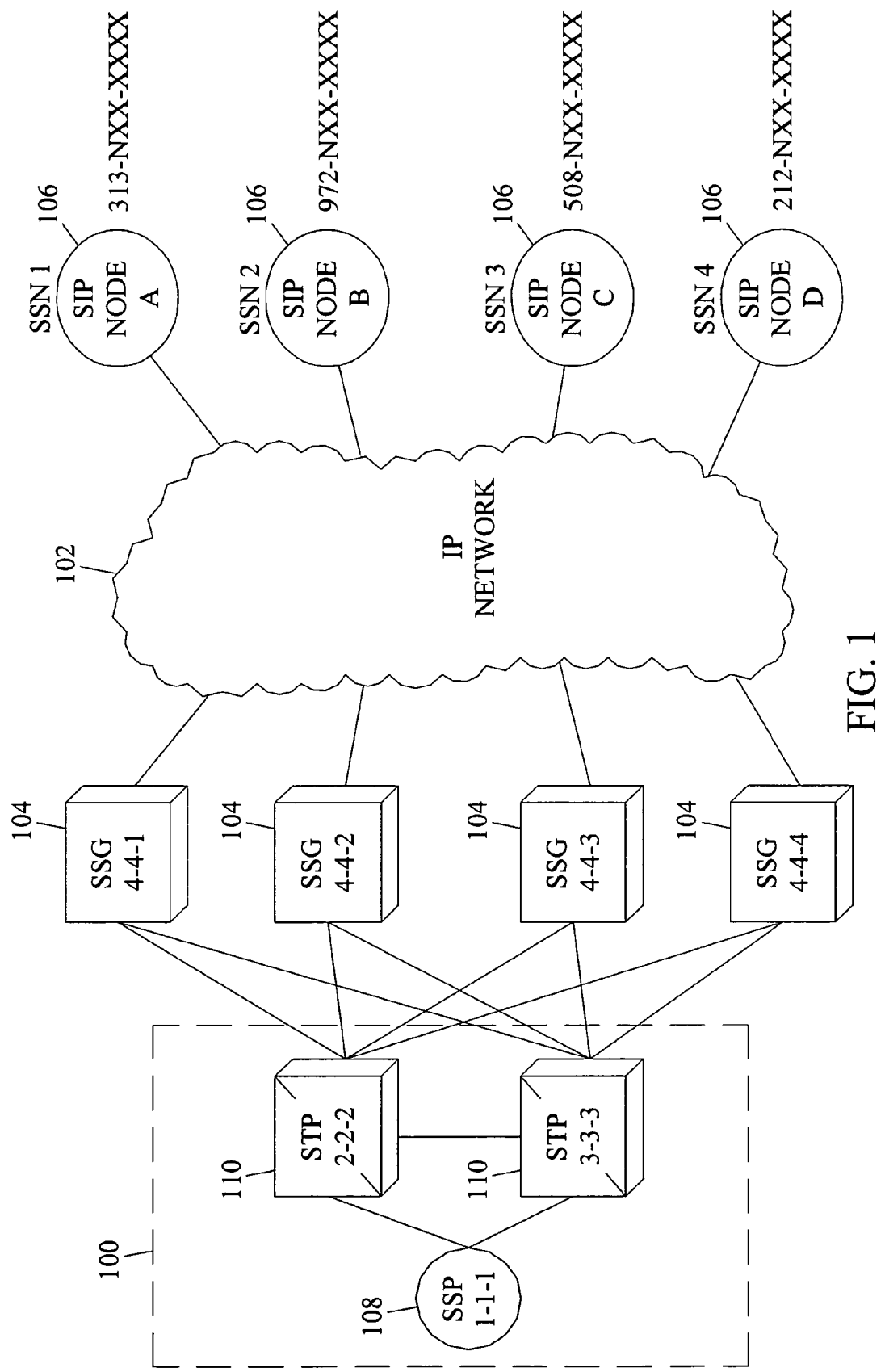
FIG. 1 is a block diagram of an exemplary SS7 network and an exemplary IP network including a plurality of SSGs configured to use SS7 subsystem numbers to route messages to SIP nodes in the IP network according to an embodiment of the subject matter described herein.

The methods, systems, and computer program products may be implemented in an SSG positioned at an interface between an SS7 network and an IP network. FIG. 1 is a block diagram of an exemplary SS7 network 100 and an exemplary IP network 102 including a plurality of SSGs 104 configured to use SS7 subsystem numbers to route messages to SIP nodes 106 in IP network 102 according to an embodiment of the subject matter described herein. Referring to FIG. 1, SSGs 104 may be configured to serve as internetworking nodes for the communication of messages between networks 100 and 102. SS7 network 100 may include an SSP 108 and signal transfer points (STPs) 110 operable to route and exchange SS7 messages with one another and SSGs 104. IP network 102 may include a plurality of SIP nodes 110 that are each operable to provide services for predetermined directory number ranges. For example, SIP nodes 106 may provide services to the directory number ranges 313-NXX-XXXX, 972-NXX-XXXX, 508-NXX-XXXX, and 212-NXX-XXXX. An exemplary SIP node may be any suitable SIP server such as a voice server.

Figure 2:
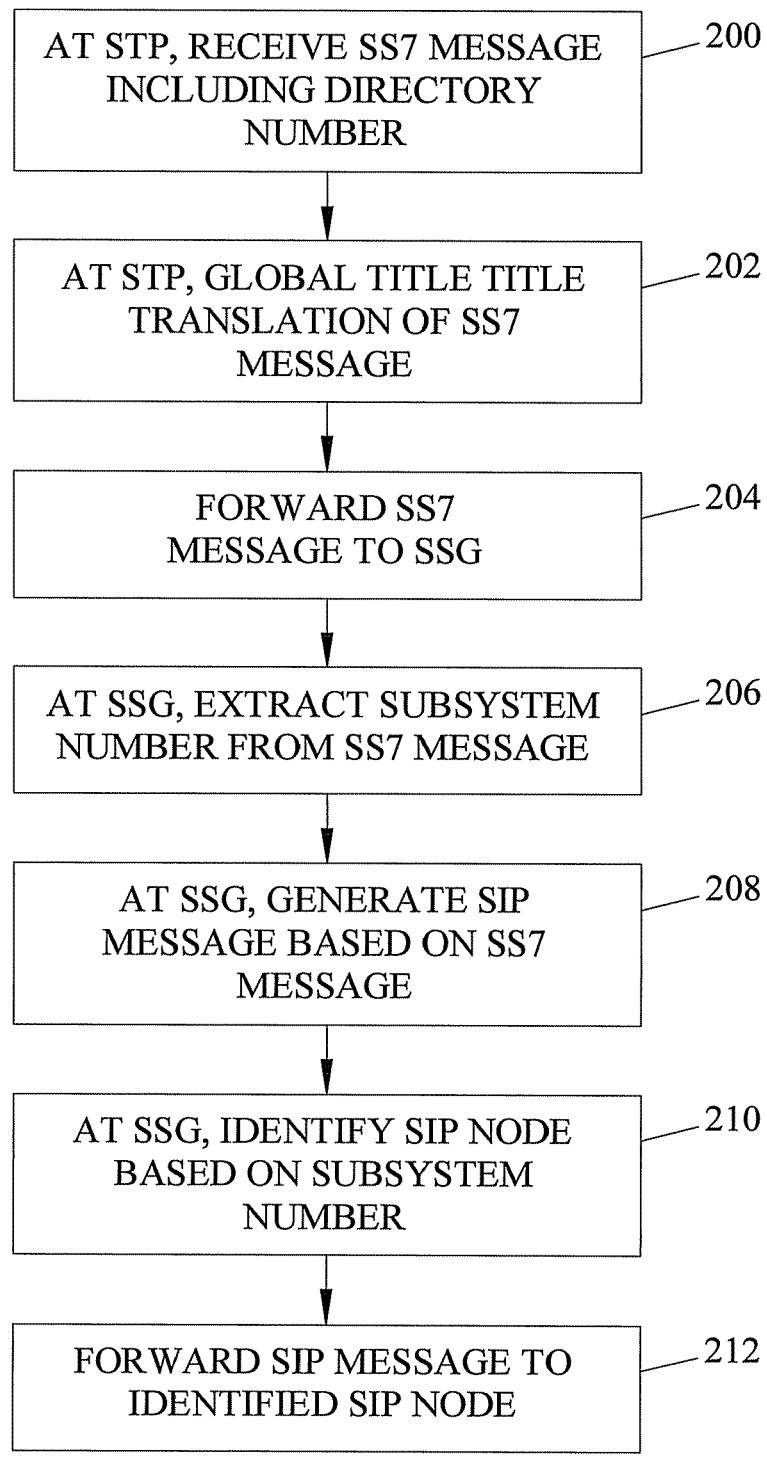
FIG. 2 is a flow chart of an exemplary process for use by SSGs and STPs shown in FIG. 1 for using an SS7 subsystem number to route a message to a SIP node according to an embodiment of the subject matter described herein.

FIG. 2 is a flow chart illustrating an exemplary process for use by SSGs 104 and STPs 110 shown in FIG. 1 for using an SS7 subsystem number to route a message to a SIP node according to an embodiment of the subject matter described herein. Referring to FIG. 2, one of STPs 110 may receive an SS7 message including a directory number that is provided service by one of SIP nodes 106 (block 200). In block 202, STP 110 performs global title translation (GTT) of the directory number in the SS7 message to determine a subsystem number associated with a SIP destination. The SS7 message including the subsystem number may be forwarded to one of SSGs 104 (block 204).

In block 206, SSG 104 may receive the SS7 message from STP 108 and extract the subsystem number from the subsystem number field of the SS7 message. In block 208, SSG 104 may generate a SIP message based on the SS7 message. SSG 104 may use the subsystem number to identify a destination SIP node address for the generated SIP message (block 210). For example, SSG 104 may maintain a table that maps the subsystem number to an IP address and a port number of one of SIP nodes 106. In block 212, SSG 104 may forward the SIP message to the identified destination SIP node 106. For example, SSG 104 may forward the SIP message to the destination SIP node 104 by using the IP address and port number in the table that corresponds to the SSN for the SS7 message. As a result of this exemplary process, SSG 104 may use SS7 subsystem numbers for routing messages to SIP nodes.

Conventionally, a subsystem number field in an SS7 message is used for identifying subsystems in the SS7 domain. That is, a subsystem number is used in conjunction with an SS7 point code address to identify a processing subsystem associated with an SS7 signaling point. According to the subject matter described herein, an SSG may use a subsystem number in a message to route a message to a SIP node. This technique may be advantageous, for example, because a SIP node and SSG are not tied together. That is, an SSG node may service or route traffic to any of a plurality of SIP nodes. Further, this technique may be advantageous, for example, because it is not necessary that the SSG maintain a directory number database. This technique may also be advantageous, for example, because all SIP nodes may be reached via any SSG. Further, this technique may be advantageous, for example, because additional SSG or SIP nodes may be added to the network without affecting existing SSG functionality. Further, this technique may be advantageous because the SSG is not required to maintain a service-related database, such as a directory number database.

Figure 3:
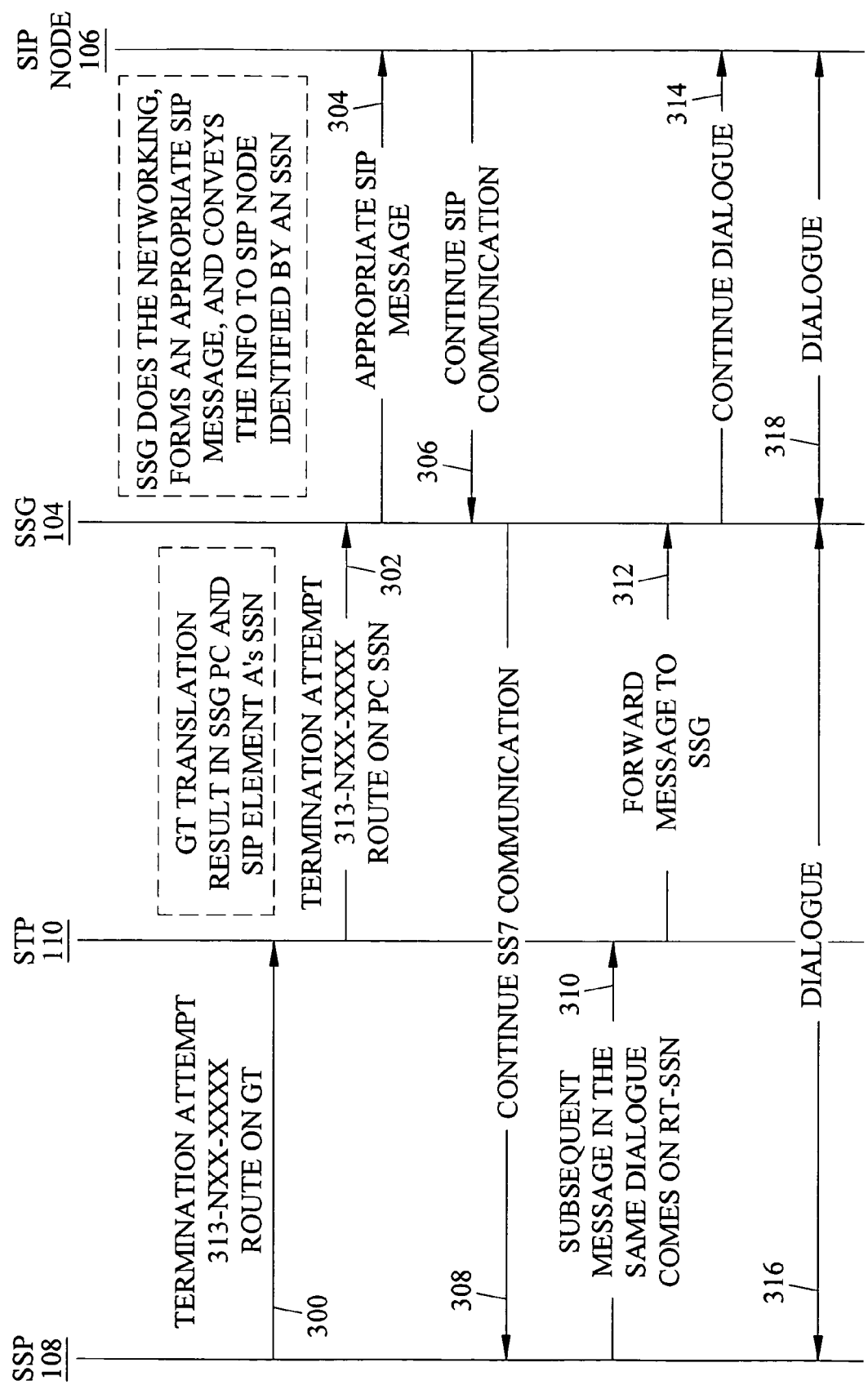
FIG. 3 is an exemplary message flow diagram associated with the transmission of messages in the SS7 network and the IP network shown in FIG. 1 according to an embodiment of the subject matter described herein.

FIG. 3 illustrates an exemplary message flow diagram associated with the transmission of messages in SS7 network 100 and IP network 102 shown in FIG. 1 according to an embodiment of the subject matter described herein. Referring to FIG. 3, in step 300 an SS7 AIN/IN query message is routed from SSP 108 to STP 110 based on "route on global title" using subscriber number 313-NXX-XXXX as the global title address. STP 110 may perform final global title translation based on the SS7 AIN/IN query message to result in a point code for SSG 104 and a subsystem number for SIP node 106. STP 110 may include a route table listing all adjacent point code addresses for SSGs 104. In one implementation, route costs for routes to SSGs 104 may be equal, and messages may be load shared between SSGs 104. In step 302, STP 110 may route the message to SSG 104 based on the SSG point code address resulting from the global title translation.

SSG 104 may generate a SIP message based on the SS7 AIN/IN query message. SSG 104 may identify the subsystem number in the SS7 message. Further, SSG 104 may identify, based on the subsystem number, destination SIP node 106 for the SIP message. The SIP message may include a field containing the subsystem number provided by global title translation. In step 304, the SIP message may be forwarded to SIP node 106 identified using the subsystem number.

In step 306, SIP node 106 may respond with a SIP message for continuing SIP communication. SSG 104 may generate, based on the SIP message, an SS7 message for continuing SS7 communication. SSG 104 may use signaling connection and control part (SCCP) calling party information or originating point code information from the SS7 message in step 302 to route the message to SSP 108 (step 308). Steps 310-318 include the exchange of subsequent message belonging to the same dialogue between SSG 104, SSP 108, STP 110, and SIP node 106. These subsequent messages may be routed on the same point code and subsystem number. The point code is the point code for SSG 104 that received the initial query at step 302.

Figure 4:
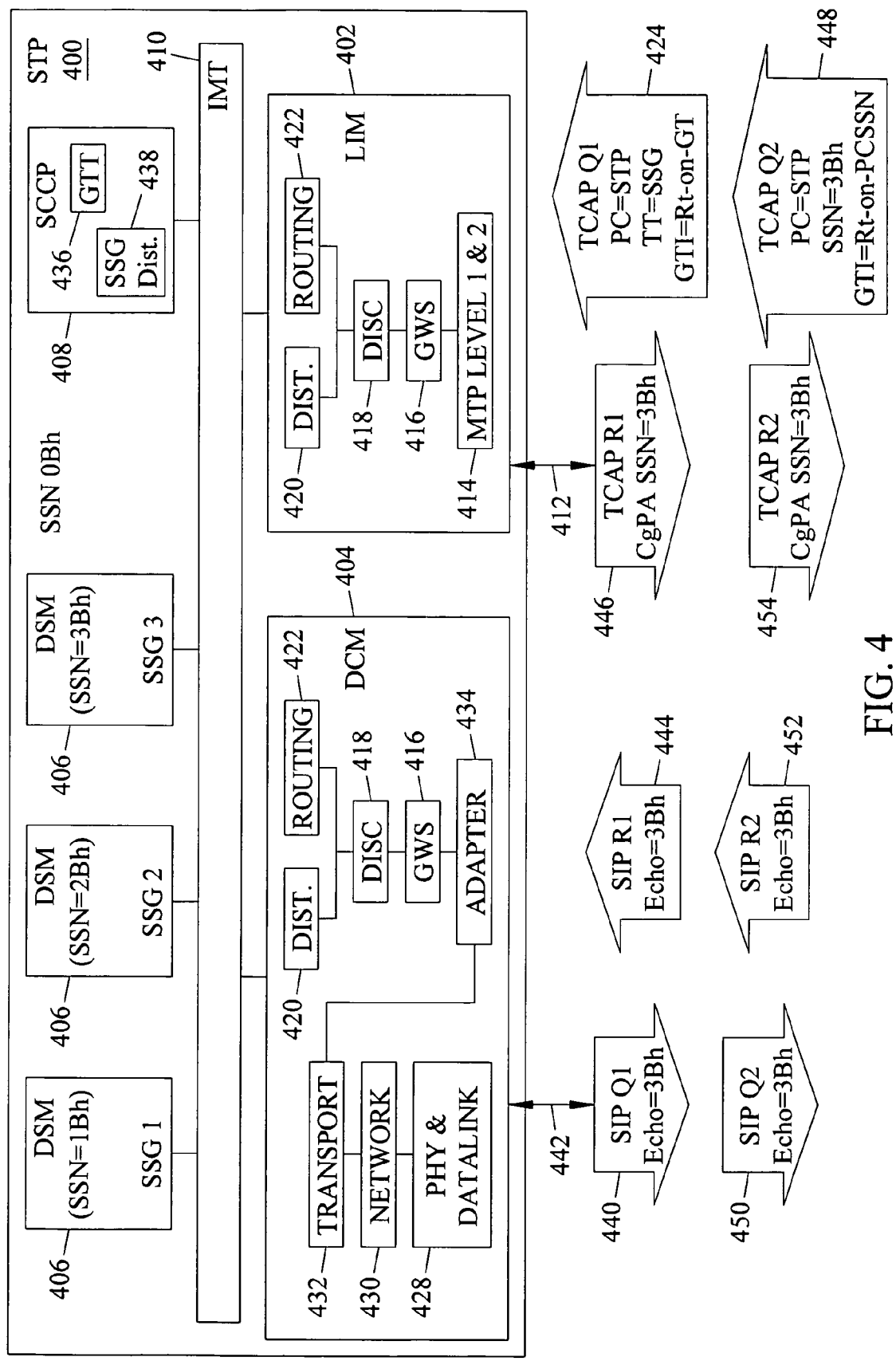
FIG. 4 is a block diagram of an exemplary internal architecture of an STP configured to use SS7 subsystem numbers for routing messages to SIP nodes according to an embodiment of the subject matter described herein.

FIG. 4 is a block diagram illustrating an exemplary internal architecture of an STP 400 configured to use SS7 subsystem numbers for routing messages to SIP nodes according to an embodiment of the subject matter described herein. In this embodiment, SSG functionality is integrated with STP 400. Referring to FIG. 4, STP 400 includes a plurality of processing modules 402, 404, 406, and 408 coupled to each other via an interprocessor message transport (IMT) bus 410. Module 402 may be a link interface module (LIM). Module 404 may be a data communications module (DCM). Modules 406 may be SSG modules operable to perform SSG processing. In particular, SSG modules 406 may generate SIP messages based on SS7 messages and generate SS7 messages based on SIP messages. Module 408 may include an SCCP function operable to perform global title translation. From a hardware perspective, each module 402, 404, 406, and 408 may include an application processor for performing application level functions and a communications processor for communicating with other processing modules via bus 410. From a software perspective, each module 402, 404, 406, and 408 may include telecommunications software applications for performing various telecommunications routing and processing functions.

In the illustrated example, LIM 402 is operable to send and receive SS7 messages over a SS7 signaling link 412. For example, LIM 402 may communicate with an SSP by sending and receiving SS7 messages over SS7 link 412. LIM 402 may include an MTP level 1 and 2 function 414, a gateway screening function 416, a discrimination function 418, a distribution function 420, and a routing function 422. MTP level 1 and 2 function 414 performs MTP level 1 and 2 operations, such as sequencing of SS7 signaling messages, error correction, and error detection. Gateway screening function 416 screens SS7 signaling messages based on originating and/or destination point code values to determine whether or not to allow the signaling messages into a network. Discrimination function 418 determines whether received SS7 messages are associated with SSG processing within STP 400. For example, LIM 402 may receive an SS7 TCAP query message 424 addressed to a point code of STP 400. Further, in this example, message 424 may include translation type value that is associated with SSG processing and a global title indicator associated with route on global title. Discrimination function 418 may forward message 424 to distribution function 420 based on the contents of message 424. Other received messages that are not associated with SSG processing at STP 400 may be forwarded to distribution function 420 for distribution to an appropriate module of STP 400 or forwarded to routing function 422.

Distribution function 420 may distribute messages to SCCP function 408 for global title translation processing or to another appropriate module of STP 400. For example, distribution function 420 may forward message 424 to SCCP function 408 for global title translation processing. Routing function 422 may include MTP routing tables for routing messages to a module associated with the outbound signaling link for messages that are identified as being addressed to an external signaling link.

DCM 404 may send and receive SIP messages over an IP signaling link 326. DCM 404 includes a physical and datalink layer 428, a network layer 430, a transport layer 432, an adaptation layer 434, gateway screening function 416, discrimination function 418, distribution function 420, and routing function 422. Physical and datalink layer 428 performs open systems interconnection (OSI) physical and datalink layer functions, such as framing, error detection and correction, and modulation/demodulation required to send and receive signals over a physical medium. Network layer 430 performs network layer functions, such as IP routing. Transport layer 432 performs functions for ensuring reliable delivery of messages over an unreliable network. Transport layer 432 may implement any suitable transport protocol, such as TCP, SCTP, or UDP. Adaptation layer 434 performs functions for sending and receiving SS7 messages over an underlying IP network. In one example, adaptation layer 434 may implement MTP level 3 user adaptation (M3UA) layer, as described in the correspondingly named IETF SIGTRAN RFCs. Alternatively, adaptation layer may implement M2UA, SUA, TALI, or other suitable adaptation layer as described in the corresponding IETF RFCs.

SIP messages received by DCM 404 may bypass adaptation layer 434, since SIP messages do not require SIGTRAN protocols for transport. Distribution function 420 of DCM 404 may be configured to distribute SIP messages to one of SSG modules 406 based on subsystem number parameters carried in the SIP messages.

SCCP function 408 is an SCCP services module that includes a global title translation function 436 and an SSG distribution function 438. SCCP function 408 may receive SS7 messages forwarded by LIM 402. Global title translation function 436 may extract a translation type value from an SS7 message and global title address information. Further, global title translation function 436 may extract other parameters, such as MTP/SCCP/TCAP parameters. Global title translation function 436 may perform global title translation processing on an SS7 message using some or all of the extracted parameters. Global title translation processing of the SS7 message may result in an SS7 point code address and subsystem number associated with a requested SSG service. In this example, the point code address within message 424 matches the point code of STP 400. Further, in this example, the subsystem number of message 424 is 0Bh, a subsystem number assigned to SSG modules 406. The subsystem number of 0Bh is assigned to the general SSG subsystem of SSG services provided by SSG modules 406. SSG distribution function 438 may forward SS7 messages requiring SSG processing to SSG modules 406.

Each module 406 may be assigned a unique subsystem number. SSG distribution function 438 may load-share SS7 messages to an available one of modules 406 for SSG processing. SSG distribution function 438 may forward an SS7 message to a selected one of modules 408 for SSG processing. For example, modules 406 are assigned subsystem numbers 1Bh, 2Bh, and 3Bh. In one example, global title translation function 436 may perform global title translation processing on message 424, and SSG distribution function 438 may forward the SS7 message to module 406 having a subsystem number 3Bh.

SSG modules 406 may perform SSG processing on SS7 messages. Each SSG module 406 may be configured to generate a SIP message based on an SS7 message. The SIP message may include the unique subsystem number associated with the SSG module performing SSG processing. For example, SSG module 406 associated with subsystem number 3Bh may receive SS7 message 424 and generate a corresponding SIP query message 440 including the subsystem number 3Bh. In one example, the SIP Echo method may be used to carry the subsystem number for an SSG within the SIP message. SSG module 406 may forward SIP messages to DCM 404 for communication to an appropriate destination SIP node via an IP signaling link 442. SSG module 406 may identify the destination SIP node using a table that maps subsystem numbers to SIP destination IP addresses and port numbers, if SSG module 406 serves multiple SIP nodes. If SSG module 406 serves a single SIP node, SSG module 406 may address the SIP message to that node. DCM 404 may receive SIP query message 440 and communicate message 440 to the identified destination SIP node via IP signaling link 442. Each SSG module may include an associated gateway function that generates the SIP message, identifies the SIP destination, and forwards the SIP message to an appropriate DCM.

The destination SIP node may generate a SIP response message to the query message including a subsystem number identifying one of SSG modules 406 in response to receiving the SIP query message including the subsystem number. The SIP node may route the SIP response message to DCM 404. For example, a SIP node may receive SIP query message 440 including subsystem number 3Bh and generate a SIP response message 444 including the subsystem number 3Bh. In this example, the SIP node may communicate SIP response message 440 to DCM 404 of STP 400.

DCM 404 may receive a SIP message including a subsystem number that identifies an SSG module of STP 400. For example, DCM 404 may receive SIP response message 444 that includes the subsystem number 3Bh for identifying the SSG module 406 associated with the same subsystem number. Physical and datalink layer 428 may perform OSI physical and datalink layer functions on the SIP message. Network layer 430 may perform network layer functions on the SIP message. Transport layer 432 may perform functions for ensuring reliable delivery of the SIP message. Discrimination function 418 may extract the subsystem number and determine that the SIP message is addressed to SSG module 406 associated with the same subsystem number. If discrimination function 418 determines that the SIP message is addressed to SSG module 406 associated with the same subsystem number, discrimination function 418 forwards the SIP message to distribution function 420 for distributing the SIP message to SSG module 406 associated with the subsystem number contained in the SIP message.

SSG module 406 associated with the subsystem number contained in a SIP message may receive the SIP message. For example, DCM 404 may forward SIP response message 444 having subsystem number 3Bh to SSG module 406 having matching subsystem number 3Bh. SSG module 406 associated with the same subsystem number as the SIP message may include state information associated with the SIP-SS7 transaction or session associated with the message. For example, SSG module 406 may include state information associated with SS7 message 424 and SIP messages 440 and 444. SSG module 406 may generate an SS7 response message 446 that corresponds to SIP response message 444. Message 444 may include the subsystem number 3Bh that is the same as SSG module 406 that generates message 444. Next, SSG module 406 may forward the SS7 response message to an appropriate outbound SS7 link 412. For example, SSG module 406 may forward SS7 response message 446 to LIM 402 for transmission via SS7 link 412.

LIM 402 may receive a second SS7 TCAP query message 448 associated with the same transaction as messages 424, 440, 444, and 446. Message 448 may be addressed to a point code of STP 400. Further, message 448 may include a called party (CdPA) subsystem number of 3Bh and include a global title routing indicator, which indicates that the message is to be routed based on point code and the subsystem number. Functions 414 and 416 may process and forward message 448 to discrimination function 418. Discrimination function 418 may examine the SCCP subsystem number of message 448 and forward message 448 to distribution function 420 based on the subsystem number. Distribution function 420 may route message 448 to SSG module 406 having the matching subsystem number 3Bh. No global title translation is required by SCCP function 408.

SSG module 406 may receive and apply SSG processing to message 448. SSG module 406 may generate a SIP query message 450 based on query message 448. SIP query message 450 may include the subsystem number 3Bh associated with SSG module 406 generating SIP message 450. SIP message 450 may be forwarded to DCM 404 for communication to the destination SIP node.

The destination SIP node may generate a SIP response message 452 in response to receiving SIP query message 450. SIP response message 452 may include subsystem number 3Bh. SIP response message 452 may be communicated to DCM 404 via IP link 442. DCM 404 may examine SIP response message 452 and extract the subsystem number 3Bh. Further, DCM 404 may forward SIP response message 452 to SSG module 406 having a matching subsystem number 3Bh.

SSG module 406 with matching subsystem number 3Bh may receive message 452 and generate a corresponding SS7 TCAP response message 454 based on SIP response message 452. SS7 TCAP response message 454 includes an SCCP calling party (CgPA) subsystem number 3Bh. Message 454 is forwarded to LIM 402 for communication to the originator of message 448.

In the embodiment shown in FIG. 4, SSG modules 406 are integrated within STP 400 and are each assigned subsystem numbers. Further, a single point code is associated with SSG modules 406. This embodiment may be advantageous, for example, because each SSG does not require a separate point code. Therefore, SS7 point codes may be conserved within an operator's network.

The embodiment shown in FIG. 4 may also be advantageous, for example, because a plurality of SS7 subsystem numbers may be used rather than SS7 point code addresses. For example, subsystem numbers used by SSGs 406 may be spare subsystem number values, i.e., subsystem number values that are not used for other purposes in a carrier's network. Further, for example, the subsystem numbers may be stored in unused or non-essential SCCP/TCAP fields of SS7 messages.

Further, the embodiment shown in FIG. 4 may be advantageous, for example, because directory number provisioning may be managed by global title translation function 436. As a result, each SSG module 406 does not have to maintain information regarding directory number provisioning.

Figure 5:
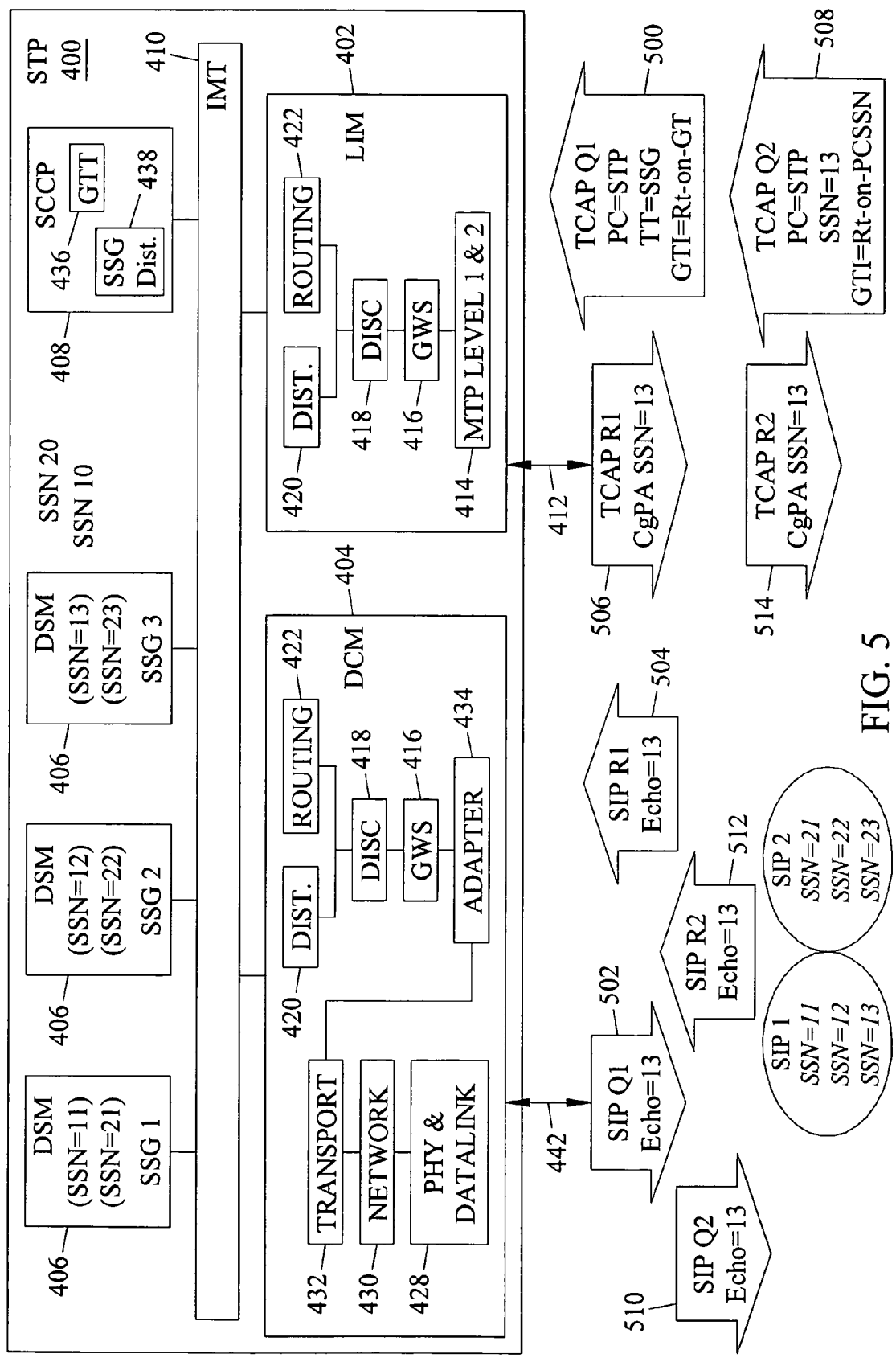
FIG. 5 is a block diagram of the internal architecture of STP shown in FIG. 4 configured with a plurality of SS7 subsystem

FIG. 5 is a block diagram illustrating the internal architecture of STP 400 configured with a plurality of SS7 subsystem numbers assigned to each SSG module 406 for routing messages to SIP nodes according to an embodiment of the subject matter described herein. In this example, a dual layer subsystem number hierarchy is used for identifying a cluster of SSG modules that are configured to service a particular SIP node and for identifying a particular SSG module of the cluster that is handling a particular SIP-SS7transaction. For the purposes of illustration, a "cluster subsystem number" is referred to herein as a subsystem number that identifies a group of SSG modules servicing a particular SIP node. An SSG module may be a member of multiple clusters, as shown in FIG. 5. In alternate embodiments, the SSG modules comprising a cluster may be dedicated to servicing a single SIP node. Further, for the purposes of illustration, a "module subsystem number" is referred to herein as a subsystem number that identifies an SSG module handling a particular SIP-SS7 transaction.

In this example, there are two SIP nodes (referred to as SIP 1 and SIP 2) being serviced by STP 400. SIP nodes SIP 1 and SIP 2 are associated with cluster subsystem numbers 10 and 20, respectively. SSG modules 406 are associated with cluster subsystem numbers 10 and 20 for indicating that the modules are assigned to service SIP nodes SIP 1 and SIP 2, respectively. Further, SSG modules 406 may be assigned one or more module subsystem numbers, where each assigned module subsystem uniquely identifies a SIP node that the SSG module is adapted to service. In this example, SSG module 406 labeled SSG 1 is associated with the module subsystem numbers 11 and 21. SSG module 406 labeled SSG 2 is associated with the subsystem numbers 12 and 22. SSG module 406 labeled SSG 3 is associated with the subsystem numbers 13 and 23. The subsystem numbers in SSG modules 406 are used to identify SIP endpoints to which SSG-generated SIP messages are routed. These module subsystem numbers enable messages (both SIP and TCAP) subsequent to the initial TCAP query to be routed directly to the specific SSG module that is controlling the SIP-SS7 transaction.

Referring to FIG. 5, LIM 402 of STP 400 may receive an initial SS7 TCAP query message 500 addressed to a point code of STP 400. Further, in this example, message 500 may include a translation type value that is associated with SSG processing and a global title routing indicator associated with route on global title processing. Functions 414 and 416 may process message 500 and forward message 500 to discrimination function 418 may forward message 500 to distribution function 420 based on the contents of message 500. Distribution function 420 may distribute message 500 to SCCP function 408 for global title translation processing.

Global title translation function 436 may extract a translation type value and global title address information from message 500. The global title address information may be a directory number, mobile telephone number, or other telephone service subscriber identifier. Further, global title translation function 436 may extract other parameters, such as MTP/SCCP/TCAP parameters. Global title translation function 436 may perform global title translation processing on message 500 based on the extracted information and parameters. Global title translation processing of message 500 results in a point code and a cluster subsystem number associated with a requested SSG service. Further, the cluster subsystem number may be mapped to destination information of a target SIP endpoint node (e.g., a voice server) and a plurality of SSG modules 406. In this example, the global title translated point code is the point code of STP 400. Further, in this example, the subsystem number is 10, a cluster subsystem number of STP 400 that is mapped to SSG modules 406 configured to service SIP 1 node. SSG distribution function 438 may forward or loadshare message 500 to an available one of SSG modules 406 associated with cluster subsystem number 10. In this example, message 500 is forwarded to SSG module 406 labeled SSG 3, and associated with module subsystem number 13.

SSG module 406 associated with module subsystem number 13 may receive message 500 and generate a corresponding SIP query message 502 based on message 500. SIP query message 502 may include subsystem number 13 associated with the SSG module 406 labeled SSG 3. DCM 404 may route SIP query message 502 to the destination SIP node indicated in message 502.

DCM 404 may receive a SIP response message 504 that includes the subsystem number associated with SSG module 406 that originated message 502. Message 504 may include subsystem number 13 for identifying the appropriate SSG module 306. DCM 404 may examine the subsystem number within message 504 and communicate message 504 to SSG module 406 associated with the same subsystem number. In particular, message 504 may be routed to SSG module 406 associated with subsystem number 13.

SSG module 406 having subsystem number 13 may generate a corresponding SS7 TCAP response message 506 including subsystem number 13. Message 506 may be routed to LIM 402 for communication to the originating node of SS7 TCAP query message 500.

LIM 402 may receive another SS7 TCAP query message 508 related to the same transaction as messages 500, 502, 504, and 506. Message 508 may be addressed to the point code of STP 400. Further, message 508 may include a called party address subsystem number 13 and include a global title routing indicator associated with route on the point code and the subsystem number. Functions 414 and 416 may process and forward message 508 to discrimination function 418. Discrimination function 418 may examine the subsystem number of message 508 and forward message 508 to distribution function 420 based on the subsystem number. Distribution function 420 may route message 508 to SSG module 406 having the matching subsystem number 13. No global title translation is required by SCCP function 408.

SSG module 406 may receive and apply SSG processing to message 508. SSG module 406 may generate a SIP message 510 based on message 508. SIP message 510 may include the subsystem number 3Bh that is associated with SSG module 406 generating SIP query message 510. SIP message 510 may be forwarded to DCM 404 for communication to the destination SIP node SIP 1.

The destination SIP node SIP 1 may generate a SIP response message 512 in response to SIP message 510. SIP response message 512 may include subsystem number 13. The SIP node may be communicated to DCM 404 via IP link 442. DCM 404 may examine SIP response message 512 and extract the subsystem number 13. Further, DCM 404 may forward SIP response message 512 to SSG module 406 having a matching subsystem number 13.

SSG module 406 with subsystem number 13 may receive message 512 and generate a corresponding SS7 TCAP response message 514 based on SIP response message 512. SS7 TCAP response message 514 includes an SCCP calling party subsystem number 13. Message 514 is forwarded to LIM 402 for communication to the originator of message 508.

SSN Conservation

STP 400 shown in FIG. 5 uses a plurality of subsystem numbers per point code. In particular, STP 400 uses ((m*n)+n) subscriber numbers per point code, wherein m is the number of SSGs 406 and n is the number of SIP nodes. In the example shown in FIG. 5, STP 400 uses 8 subsystem numbers. The technique of using subsystem numbers may be simplified by assigning only one subsystem number per DSM/SSG rather than assigning one subscriber subsystem identifier for each SIP node point code. For example in FIG. 5, subsystem numbers 10 and 20 can be assigned to SIP nodes SIP 1 and SIP 2, respectively. Subsystem numbers 1, 2, and 3 can be assigned to SSG modules SSG 1, SSG 2, and SSG3, respectively. In this example, the point code of STP 400 is assumed to be 1-1-1. The following routing keys can be defined in STP 400 according to the list below (wherein ASSOC 1, ASSOC 2, and ASSOC 3 can be defined in DCM 404 of STP 400 to establish 3 SCTP associations to SSG modules 406 labeled as SSG1, SSG2, and SSG3, respectively):

1. Point code (1-1-1)+SSN 10=ASSOC 1, ASSOC 2, and ASSOC 3
2. Point code (1-1-1)+SSN 20=ASSOC 1, ASSOC 2, and ASSOC 3
3. Point code (1-1-1)+SSN 1=ASSOC 1
4. Point code (1-1-1)+SSN 2=ASSOC 2
5. Point code (1-1-1)+SSN 3=ASSOC 3

The list above shows the relationship between routing keys and SCTP associations. For example, item 1 of the list means that traffic for point code 1-1-1 and subsystem number 10 may be reached via associations ASSOC 1, ASSOC 2, and ASSOC 3. In item 2 of the list, traffic for point code 1-1-1 and subsystem number 20 may be reached via associations ASSOC 1, ASSOC 2, and ASSOC 3. In item 3 of the list, traffic for point code 1-1-1 and subsystem number 1 may be reached via association ASSOC 1. In item 4 of the list, traffic for point code 1-1-1 and subsystem number 2 may be reached via association ASSOC 2. In item 5 of the list, traffic for point code 1-1-1 and subsystem number 5 may be reached via association ASSOC 3.

In one example, when a query message is received by the STP which requires global title translation, it is assumed for purposes of this example that the global title translation results in a point code of 1-1-1 and subsystem number 10 (i.e., the query message has a destination of SIP node 1). The STP may examine a routing key table and route the SS7 TCAP query message via one of the available SCTP associations using a load share algorithm. In this example, it is assumed that association ASSOC 1 is selected. Association ASSOC 1 terminates at SSG module SSG 1. In response, SSG module SSG 1 generates a corresponding SIP query message based on the SS7 query message and communicates the SIP query message to destination SIP node 1. SIP node 1 may generate a SIP response message and communicate the response message to the STP, which internally forwards the SIP response message to SSG module SSG 1. SSG module SSG 1 generates a corresponding SS7 TCAP query message including the subsystem number associated with SSG module SSG 1 (i.e., subsystem number 1). The subsystem number may be placed in the calling party address field. Subsequent messages associated with call will include the point code of the STP (i.e., 1-1-1) and the subsystem number associated with SSG module SSG 1 (i.e., 1). The routing key associated with 1-1-1 and subsystem number 1 is association ASSOC 1. Therefore, the subsequent messages associated with the call will be forwarded to SSG module SSG 1. This approach consumes the number of m+n subsystem numbers rather than the number of (m*n)+n subsystem numbers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using signaling system number 7 (SS7) subsystem numbers to route messages to session initiation protocol (SIP) nodes, the method comprising:
uniquely assigning SS7 subsystem numbers to a plurality of different SIP nodes or groups of SIP nodes;
receiving an SS7 message;
generating a SIP message based on the SS7 message;
identifying an SS7 subsystem number associated with the SS7 message;
identifying, based on the subsystem number, a destination SIP node for the SIP message, and performing a lookup for the subsystem number from the SS7 message to identify the destination SIP node from the plurality of different SIP nodes, wherein the subsystem number uniquely identifies a SIP node or a group of SIP nodes; and
forwarding the SIP message to the SIP node.

2. The method of claim 1 wherein identifying a subsystem number associated with the SS7 message includes extracting the subsystem number from the SS7 message.

3. The method of claim 1 wherein identifying a subsystem number associated with the SS7 message includes performing a global title translation for the SS7 message.

4. The method of claim 1 wherein at least the receiving, generating, identifying an SS7 subsystem number, and identifying a destination SIP node are performed using a signaling transfer point and an SS7/SIP gateway external to the signal transfer point.

5. The method of claim 1 wherein at least the receiving, generating, identifying an SS7 number, and identifying a destination SIP node are performed using a signal transfer point and an SS7/SIP gateway located internal to the signal transfer point.

6. The method of claim 1 comprising assigning at least one additional subsystem number to a group of SIP nodes for load sharing purposes.

7. The method of claim 1 wherein performing a lookup for the subsystem number from the SS7 message includes performing a lookup in a table that maps subsystem numbers to Internet protocol (IP) addresses and port numbers of the SIP nodes.

8. A method for distributing an signaling system number 7 (SS7) message to one of a plurality of SS7/session initiation protocol gateways (SSGs) using signaling system number 7 (SS7 ) subsystem numbers, the method comprising:
uniquely assigning SS7 subsystem numbers to a plurality of different SIP nodes or groups of SIP nodes;
receiving an SS7 message;
performing global title translation of the SS7 message to identify an SS7 subsystem number for the SS7 message;
selecting an SSG from a plurality of SSGs based on the subsystem number;
forwarding the SS7 message to the selected SSG; and
generating, at the SSG, a first SIP message corresponding to the SS7 message and forwarding the first SIP message to a destination SIP node, and performing a lookup for the subsystem number from the SS7 message to identify the destination SIP node from the plurality of different SIP nodes, wherein the subsystem number uniquely identifies a SIP node or a group of SIP nodes.

9. The method of claim 8 wherein generating a SIP message comprises including a subsystem number that identifies the SSG in the first SIP message.

10. The method of claim 9 comprising identifying at least one second SIP message as being associated with the same transaction as the first SIP message using the subsystem number that identifies the SSG.

11. The method of claim 8 wherein performing a lookup for the subsystem number from the SS7 message includes performing a lookup in a table that maps subsystem numbers to Internet protocol (IP) addresses and port numbers of the SIP nodes.

12. A system for using signaling system number 7 (SS7) subsystem numbers to route messages to session initiation protocol (SIP) nodes, the system comprising:
at least one network device that implements SS7 service and that stores unique mappings between SS7 subsystem numbers and SIP nodes or groups of SIP nodes, the at least one network device including:
a communication module for receiving an SS7 message; and
an SS7/SIP gateway (SSG) module configured to:
generate a SIP message based on the SS7 message;

identify a subsystem number associated with the SS7 message;

identify, based on the subsystem number, a destination SIP node for the SIP message, and performing a lookup for the subsystem number from the SS7 message to identify the destination SIP node from the plurality of different SIP nodes, wherein the subsystem number uniquely identifies a SIP node or a group of SIP nodes; and forward the SIP message to the SIP node.

13. The system of claim 12 wherein the SSG module is configured to extract the subsystem number from the SS7 message.

14. The system of claim 12 comprising a global title translation function operable to perform a global title translation for the SS7 message and determine the subsystem number.

15. The system of claim 12 wherein the at least one network device comprises a signaling transfer point (STP) and an SS7/SIP gateway (SSG) external to the signal transfer point, wherein the communication module is a component of the STP and the SSG module is a component of the SSG.

16. The system of claim 12 wherein the at least one network device comprises a signaling transfer point (STP) and an SS7/SIP gateway (SSG) located internal to the signal transfer point, wherein the communication module is a component of the STP and the SSG module is a component of the SSG.

17. The system of claim 12 wherein the SSG module is configured to assign at least one subsystem number to a group of SIP nodes for load sharing purposes.

18. The system of claim 12 wherein performing a lookup for the subsystem number from the SS7 message includes performing a lookup in a table that maps subsystem numbers to Internet protocol (IP) addresses and port numbers of the SIP nodes.

19. A system for distributing an signaling system number 7 (SS7) message to one of a plurality of SS7/session initiation protocol gateways (SSGs) using signaling system number 7 (SS7) subsystem numbers, the system comprising:

at least one network device that implements SS7 service and that stores unique mappings between SS7 subsystem numbers and SIP nodes or groups of SIP nodes, the at least one network device including:

a communication module for receiving an SS7 message;

a global title translation function for performing global title translation of the SS7 message to identify an SS7 subsystem number for the SS7 message; and a distribution function for selecting an SSG from a plurality of SSGs based on the subsystem number and for forwarding the SS7 message to the selected SSG, wherein the SSG is configured to generate a first SIP message corresponding to the SS7 message and forward the SIP message to a destination SIP node, and performing a lookup for the subsystem number from the SS7 message to identify the destination SIP node from the plurality of different SIP nodes, wherein the subsystem number uniquely identifies a SIP node or a group of SIP nodes.

20. The system of claim 19 comprising a SIP node for generating a second SIP message and including a subsystem number that identifies the SSG in the second SIP message.

21. The system of claim 20 comprising a distribution function for receiving the second SIP message and identifying at least the second SIP message as being associated with the same transaction as the first SIP message using the subsystem number that identifies the SSG.

22. The system of claim 19 wherein performing a lookup for the subsystem number from the SS7 message includes performing a lookup in a table that maps subsystem numbers to Internet protocol (IP) addresses and port numbers of the SIP nodes.

23. A computer program product comprising computer executable instructions embodied in a computer readable medium for performing steps comprising:

uniquely assigning SS7 subsystem numbers to a plurality of different SIP nodes or groups of SIP nodes;

receiving an SS7 message;

generating a SIP message based on the SS7 message;

identifying an SS7 subsystem number associated with the SS7 message;

identifying, based on the subsystem number, a destination SIP node for the SIP message, and performing a lookup for the subsystem number from the SS7 message to identify the destination SIP node from the plurality of different SIP nodes, wherein the subsystem number uniquely identifies a SIP node or a group of SIP nodes; and forwarding the SIP message to the SIP node.

24. The computer program product of claim 23 wherein identifying a subsystem number associated with the SS7 message includes extracting the subsystem number from the SS7 message.

25. The computer program product of claim 23 wherein identifying a subsystem number associated with the SS7 message includes performing a global title translation for the SS7 message.

26. The computer program product of claim 23 wherein at least the receiving generating, indentifying an SS7 subsystem number, and identifying a destination SIP node are performed using a signaling transfer point and an SS7/SIP gateway external to the signal transfer point.

27. The computer program product of claim 23 wherein at least the receiving generating, indentifying an SS7 subsystem number, and identifying a destination SIP node are performed using a signal transfer point and an SS7/SIP gateway located internal to the signal transfer point.

28. The computer program product of claim 23 comprising assigning at least one subsystem number to a group of SIP nodes for load sharing purposes.

29. The computer program product of claim 23 wherein performing a lookup for the subsystem number from the SS7 message includes performing a lookup in a table that maps subsystem numbers to Internet protocol (IP) addresses and port numbers of SIP nodes.

30. A computer program product comprising computer executable instructions embodied in a computer readable medium for performing steps comprising:

uniquely assigning SS7 subsystem numbers to a plurality of different SIP nodes or groups of SIP nodes;

receiving an SS7 message;

performing global title translation of the SS7 message to identify an SS7 subsystem number for the SS7 message;

selecting an SSG from a plurality of SSGs based on the subsystem number;

forwarding the SS7 message to the selected SSG; and generating, at the SSG, a first SIP message corresponding to the SS7message and forwarding the first SIP message to a destination SIP node, and performing a lookup for the subsystem number from the SS7 message to identify the destination SIP node from the plurality of different SIP nodes, wherein the subsystem number uniquely identifies a SIP node or a group of SIP nodes.

31. The computer program product of claim 30 wherein generating a first SIP message comprises including a subsystem number that identifies the SSG in the first SIP message.

32. The computer program product of claim 31 comprising identifying at least one second SIP message as being associated with the same transaction as the first SIP message using the subsystem number that identifies the SSG.

33. The computer program product of claim 30 wherein performing a lookup for the subsystem number from the SS7 message includes performing a lookup in a table that maps subsystem numbers to IP addresses and port numbers of SIP nodes.

* * * * *